(12) United States Patent
Schroll (10) Patent No.: US 11,629,533 B2
(45) Date of Patent: Apr. 18, 2023

(54) SLIDING LATCH

(71) Applicant: The Eastern Company, Naugatuck, CT (US)

(72) Inventor: Matthew Schroll, Glendale Heights, IL (US)

(73) Assignee: The Eastern Company, Naugatuck, CT (US)

(*) Notice: Subject to any disclaimer, the term of this patent is extended or adjusted under 35 U.S.C. 154(b) by 73 days.

(21) Appl. No.: 17/329,260

(22) Filed: May 25, 2021

(65) Prior Publication Data

US 2022/0381073 A1  Dec. 1, 2022

(51) Int. Cl.
    *E05C 1/08* (2006.01)
    *E05C 1/00* (2006.01)
    *B60J 7/19* (2006.01)

(52) U.S. Cl.
    CPC .............. *E05C 1/085* (2013.01); *B60J 7/198* (2013.01); *E05C 1/004* (2013.01); *E05C 1/006* (2013.01); *Y10T 292/096* (2015.04); *Y10T 292/097* (2015.04); *Y10T 292/0962* (2015.04); *Y10T 292/0975* (2015.04); *Y10T 292/1014* (2015.04); *Y10T 292/1021* (2015.04)

(58) Field of Classification Search
    CPC .......... E05C 1/085; E05C 1/004; E05C 1/006; Y10T 292/1014; Y10T 292/1021; Y10T 292/096; Y10T 292/0962; Y10T 292/097; Y10T 292/0975
    See application file for complete search history.

(56) References Cited

U.S. PATENT DOCUMENTS

| | | | | |
|---|---|---|---|---|
| 655,476 | A * | 8/1900 | Carleton | E05B 47/0002 292/144 |
| 658,122 | A * | 9/1900 | Rogers | E05B 63/20 292/181 |
| 1,578,779 | A * | 3/1926 | Titus | E05B 65/005 292/164 |
| 1,645,333 | A * | 10/1927 | Ledwinka | E05B 85/22 292/164 |
| 1,700,487 | A * | 1/1929 | Cramer | E05C 1/163 292/164 |
| 1,762,499 | A * | 6/1930 | Baume | E05C 1/163 292/164 |

(Continued)

OTHER PUBLICATIONS

Industrial Hardware Distributors, Inc.; Spring Belts—Finger Pull Latches; www.industrialhwe.com; 3 pages.

*Primary Examiner* — Christine M Mills
*Assistant Examiner* — Faria F Ahmad
(74) *Attorney, Agent, or Firm* — Leydig, Voit & Mayer, Ltd, (57) ABSTRACT

The invention is a sliding latch with a bolt sliding in and out of a primary housing from a closed condition to an open condition on a sled that also slides in the housing. A spring biases the bolt to extend out of the housing to the closed condition. The bolt can be moved to an open condition by an electric motor mounted on the sled that rotates a threaded member to move a nut in a cavity in the bolt that pulls the bolt against the spring bias. The bolt can also be moved to an open condition by a force directly on the bolt against the spring bias. The bolt can also be moved to an open condition by a force pulling on the sled to move the sled and nut so the nut pulls the bolt against the spring bias to an open condition.

11 Claims, 5 Drawing Sheets

(56) References Cited

U.S. PATENT DOCUMENTS

| | | | | |
|---|---|---|---|---|
| 3,353,858 | A * | 11/1967 | Neary | E05B 55/005 |
| | | | | 292/164 |
| 4,050,723 | A * | 9/1977 | Papadatos | E05C 17/446 |
| | | | | 292/164 |
| 4,778,205 | A * | 10/1988 | Sayre | E05C 1/10 |
| | | | | 292/171 |
| 4,799,719 | A * | 1/1989 | Wood | E05B 47/0012 |
| | | | | 292/144 |
| 6,318,138 | B1 * | 11/2001 | Mathews | E05B 47/0012 |
| | | | | 70/279.1 |
| 6,708,625 | B1 * | 3/2004 | Burke | E05B 83/06 |
| | | | | 292/168 |
| 7,788,954 | B2 * | 9/2010 | Schumm | E05C 17/48 |
| | | | | 292/41 |
| 8,562,032 | B1 * | 10/2013 | Lin | E05C 7/06 |
| | | | | 70/108 |
| 9,151,093 | B2 * | 10/2015 | Lin | E05C 7/045 |
| 10,975,596 | B2 * | 4/2021 | Lin | E05B 63/20 |
| 2002/0083747 | A1 * | 7/2002 | Beylotte | E05B 17/0029 |
| | | | | 70/257 |
| 2004/0155477 | A1 * | 8/2004 | Lanigan | B62D 33/0222 |
| | | | | 296/50 |
| 2007/0152455 | A1 * | 7/2007 | Ko | E05B 81/16 |
| | | | | 292/201 |
| 2009/0139283 | A1 * | 6/2009 | Peng | E05B 65/1013 |
| | | | | 70/92 |
| 2010/0123323 | A1 * | 5/2010 | Geringer | E05B 47/0012 |
| | | | | 292/164 |
| 2015/0252597 | A1 * | 9/2015 | Lin | E05C 1/085 |
| | | | | 292/164 |
| 2020/0181958 | A1 * | 6/2020 | Romero | E05C 1/12 |

* cited by examiner

SLIDING LATCH

BACKGROUND OF THE INVENTION

The invention comprises a new latch with a sliding bolt biased into a closed condition that can be opened either mechanically or electrically.

BRIEF SUMMARY OF THE INVENTION

The invention is a sliding latch having a closed condition and an open condition comprising, a primary housing having a longitudinal axis and a substantially open front end and a back end with a wall having an opening, and an elongated sled having a longitudinal axis parallel to the housing longitudinal axis and a lip at a first end proximate the housing front end and a rear extension extending through the housing back end wall opening, with the sled adapted to slide in the housing along the housing longitudinal axis. An electric motor having a rotational axis parallel to the sled longitudinal axis and mounted on the sled is adapted to rotate a threaded member having an axis parallel with the motor rotational axis and extending through the opening in the back wall of the housing. A retractable bolt is adapted to slide along the primary housing longitudinal axis and extend outwardly from the housing front end in the closed condition, the bolt having a front wall and a back wall and an internal cavity, with the back wall having an opening therein and the threaded member extending through the opening into the cavity. An internally threaded nut having a first side and a second side is non-rotatingly captured in the bolt cavity, with the nut threadedly engaging the threaded member. A biasing member biases the bolt to a closed condition and has a first end contacting the outer side of the back wall of the bolt and a second end contacting the inner side of the back wall of the housing. In the closed condition, the bolt extends outwardly from the housing front end and the nut first side is adjacent the lip and the nut second side is adjacent the bolt back wall, and in a first open condition the bolt is retracted into the housing by an external force on the bolt along the longitudinal axis against the biasing member while the nut first side remains adjacent the lip. In a second open condition, the bolt is retracted into the housing by an external force pulling the sled along the housing longitudinal axis against the biasing member and the sled lip moving the nut and causing the nut second side to contact the inside of the back wall of the bolt, and in a third open condition, the bolt is retracted into the housing against the biasing member by the motor rotating the threaded member in a first direction thus moving the nut and the nut second side contacting the bolt cavity back wall.

In one embodiment, the threaded member is a screw with a threaded shaft and a drive head, and the biasing member is a spring surrounding the shaft of the threaded member.

In one embodiment, the motor has a motor drive shaft and the threaded member has a drive head and the latch includes a clutch between the motor drive shaft and the threaded member drive head. The clutch may comprise a pair of discs with one disc drivingly mounted on the motor drive shaft and the other disc drivingly mounted on the threaded member and a clutch biasing means for biasing the discs against each other.

The invention also provides a sliding latch having a closed condition and an open condition comprising a primary housing having a longitudinal axis, a substantially open front end and a back end with a wall having an opening. An elongated sled has a longitudinal axis parallel to the housing longitudinal axis and a lip at a first end proximate the housing front end and a rear extension extending through the housing back end wall opening, with the sled adapted to slide in the housing along the housing longitudinal axis. An electric motor having a rotational axis parallel to the sled longitudinal axis is mounted on the sled and adapted to rotate a threaded member having an axis parallel with the motor rotational axis and extending through the opening in the back wall of the housing. A retractable bolt adapted to slide along the primary housing longitudinal axis extends outwardly from the housing front end in the closed condition, with the bolt having a front wall, a back wall, and an internal cavity, with the back wall having an opening therein with the threaded member extending through the opening into the cavity. An internally threaded nut, non-rotatingly captured in the bolt cavity, has a first side and a second side, with the nut threadedly engaging the threaded member. A biasing member biasing the bolt to a closed condition has a first end contacting the outer side of the back wall of the bolt and a second end contacting the inner side of the back wall of the housing. In the closed condition, the bolt extends outwardly from the housing front end and the nut first side is adjacent the lip and the nut second side is adjacent the bolt back wall. In a first open condition, the bolt is retracted into the housing by an external force on the bolt along the longitudinal axis against the biasing member contracting the biasing member between the back wall of the bolt and the back wall of the housing. In a second open condition, the bolt is retracted into the housing by an external force forcing the sled away from the housing front end along the housing longitudinal axis against the biasing member causing the nut second side to contact the inside of the back wall of the bolt contracting the biasing member between the outside of the back wall of the bolt and the back wall of the housing. In a third open condition, the bolt is retracted into the housing against the biasing member by the motor rotating the threaded member in a first direction thus moving the nut and the nut second side contacting the inside of the bolt cavity back wall to contract the biasing member between the outside of the back wall of the bolt and the back wall of the housing.

Further and alternative aspects and features of the disclosed principles will be appreciated from the following detailed description and the accompanying drawings. As will be appreciated, the principles disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DESCRIPTION OF A PREFERRED EMBODIMENT

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein are made collectively or individually when there may be more than one element of the same type. However, such references are merely exemplary in nature. It may be noted that any reference to elements in the singular may also be construed to relate to the plural and vice versa without limiting the scope of the disclosure to the exact number or type of such elements unless set forth explicitly in the appended claims. The terms adapted or configured and configuration may be used herein to refer to a specified arrangement, or a structural size and shape.

Figure 1:
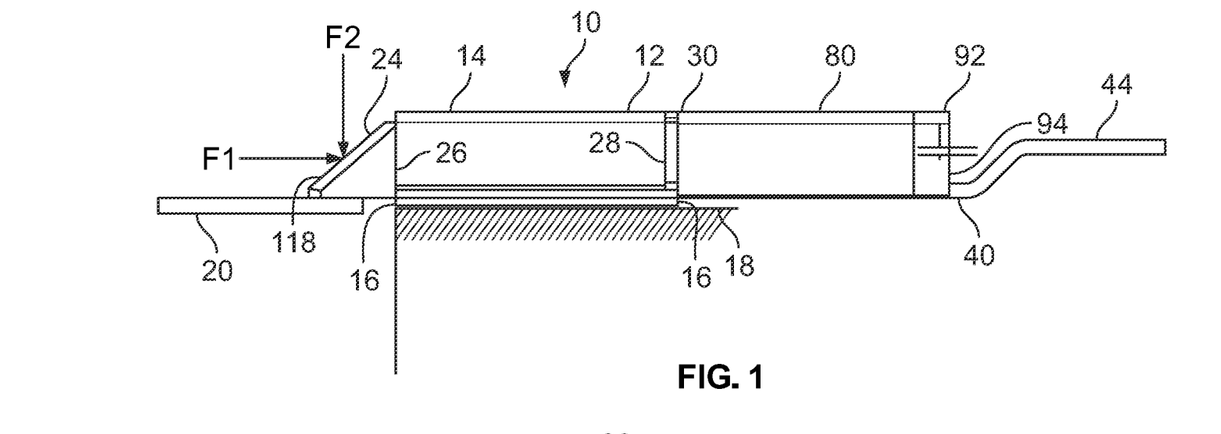
FIG. 1 is a plan view of the inventive latch in the closed condition.
Figure 2:
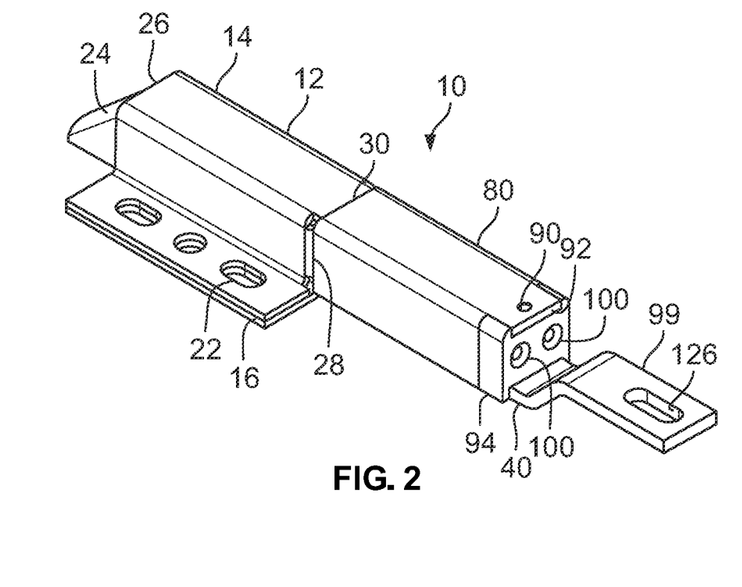
FIG. 2 is a perspective view of the inventive latch in the closed condition.
Figure 7:
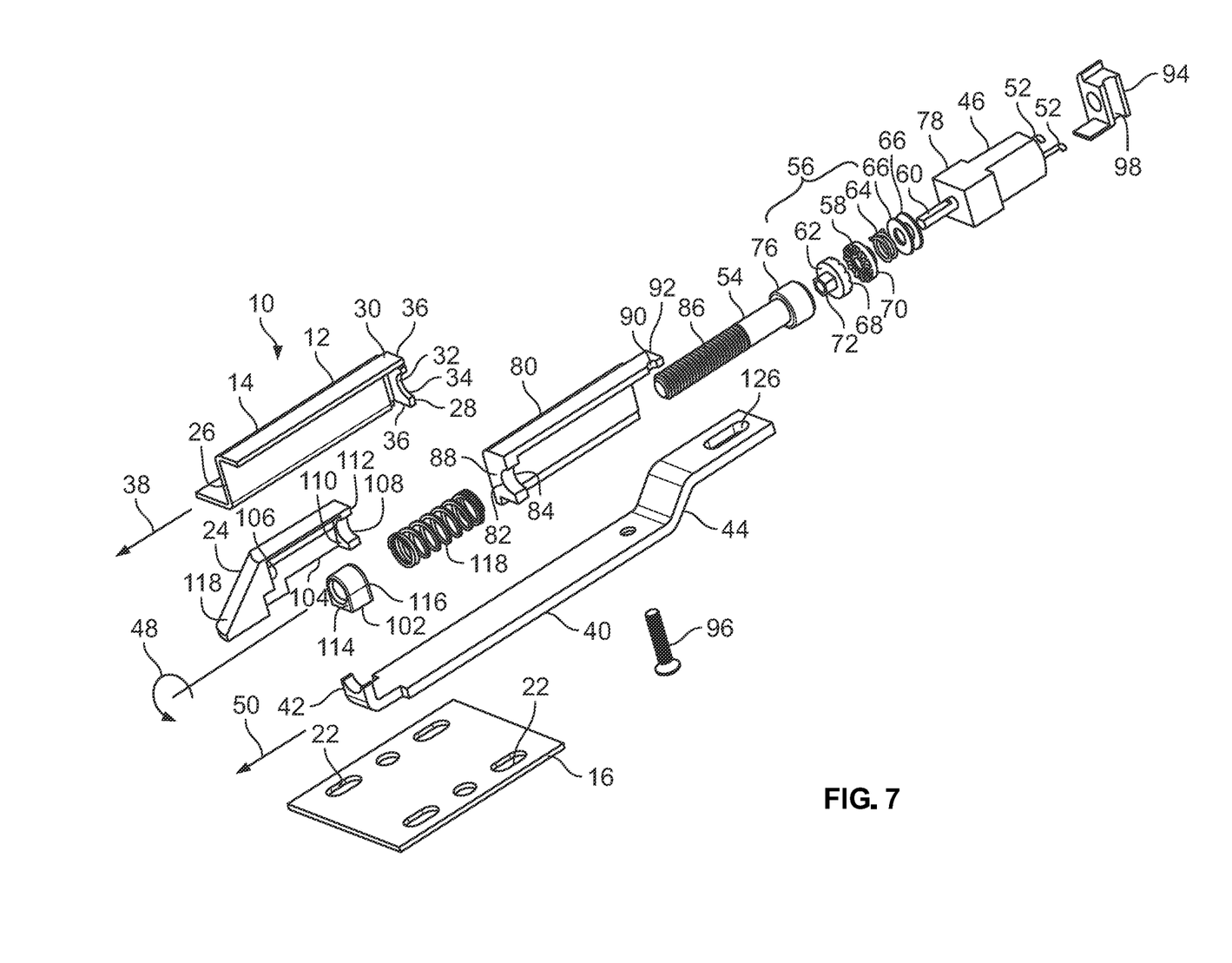
FIG. 7 is an exploded view of the inventive latch.

FIGS. 1 and 2 show a plan view and perspective view of the inventive latch 10 in a closed condition. The latch 10 comprises a primary housing 12 having a cover 14 and a base 16. As shown in FIGS. 2 and 7, mounting holes are located in extensions on both sides of the cover 14 and the base 16 for mounting the latch 10 on a substrate 18 by appropriate fasteners such as screws or rivets. As shown in FIG. 1, in use the latch will releasably capture a striker 20 behind an outwardly extending bolt 24.

The primary housing 12 is substantially hollow and has open front end 26 through which the bolt 24 extends in the closed condition to capture a striker 20, as shown in FIG. 1. The rear 30 of the primary housing 12 has a partial back wall 28 with an opening 32. As can be seen in FIG. 7, in a preferred embodiment, the opening 32 in the back wall 28 of the primary housing 12 comprises an aperture 34 and a slot 36 just above the base 16. The housing defines a longitudinal axis 38 from the front end 26 to the rear 30 of the housing.

A sled 40 also having a longitudinal axis 50 parallel to the housing longitudinal axis 38 is allowed limited sliding motion in the housing 12 above the base 16 along the housing longitudinal axis 38. The sled 40 has an upstanding lip 42 (shown in faint line in FIGS. 4-6) at one end that resides in the primary housing 12. The sled 40 passes through the slot 36 and has an extension 44 at the opposite end.

Figure 6:
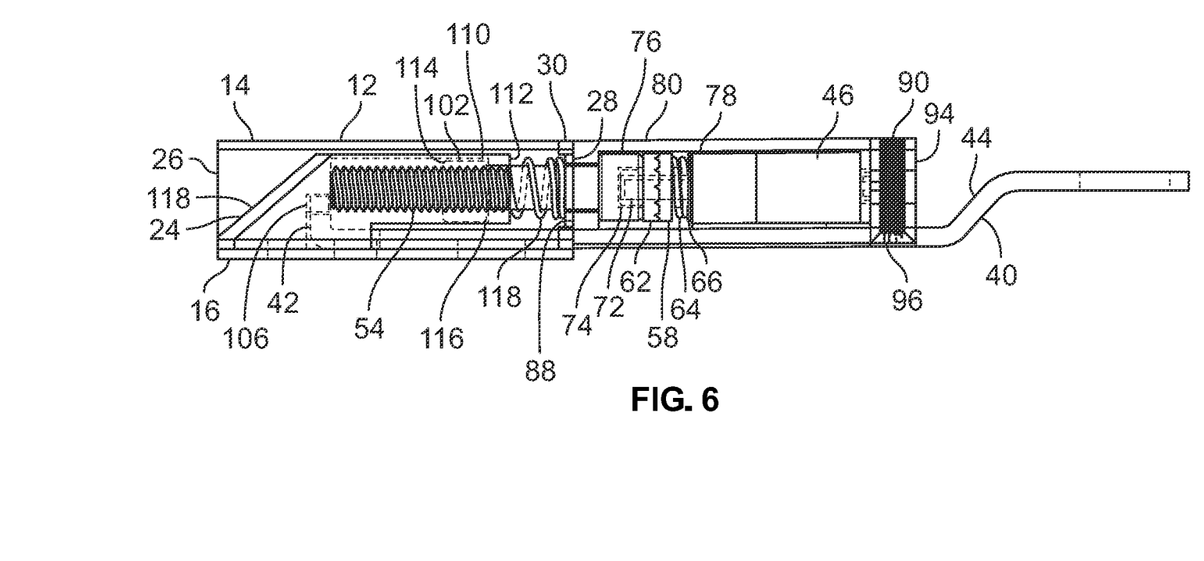
FIG. 6 is a stylized cut-away view of the inventive latch in a third open condition.

An electric motor 46 is mounted on the sled 40 outside of the primary housing 12. The electric motor may be a linear motor or a rotating motor. In a preferred embodiment, the motor is a rotating motor and has an axis of rotation 48 that is parallel to the longitudinal axis 50 of the sled 40 and the longitudinal axis 38 of the primary housing 12. Electric power to the motor is transmitted through a pair of wires 52 extending from the rear of the motor. As best seen in FIGS. 6 and 7, the motor is operatively connected to a threaded member 54 to rotate the threaded member by a slipper clutch 56. The motor has a drive shaft 60 having a circumferential "D" shape which cooperates with a complementary internal bore "D" shape of a clutch drive disc 58. The drive disc 58 is urged against a driven disc 62 by a biasing means, preferably a spring 64. A pair of washers 66 enhance the ability of the spring 64 to rotate with the drive shaft 60 and drive disc 58. A driven disc 62 has a face 68 with grooves that complement projections on the face 66 of the drive disc and a bore that has a larger or more circular circumference than the "D" shaped motor drive shaft 60. The driven disc 62 also has an extension 72, preferably hexagonal shaped, which complements a similar hexagonal shaped recess 74 in the drive head 76 of the threaded member 54 to provide torque to the threaded member 54 when the motor drive shaft 60 rotates. The motor 46 preferably has a gear box 78 that reduces the speed of rotation of the drive shaft and enhances its torque.

In a preferred embodiment, the motor 46 is mounted on the sled 40 by being captured in a motor housing 80. The motor housing 80 has a front wall 88 with an opening 82, preferably an aperture 84 through which the threaded end 86 of the threaded member 54 passes. The shoulder of the head 76 of the threaded member contacts the inside surface of the front wall 88. Near the rear end 92 of the motor housing 80 a threaded aperture accepts a screw that also passes through an aperture 98 in the sled 40 and an end cap 94 to clamp the motor housing 80 onto the sled 40. The side walls of the motor housing 80 may also be tack welded or otherwise attached to the sides of the sled 40. As seen in FIG. 2, the end cap 94 also has an aperture or pair of apertures 100 to accommodate the electrical wires 52 for the motor 46 to pass there through.

Figure 3:
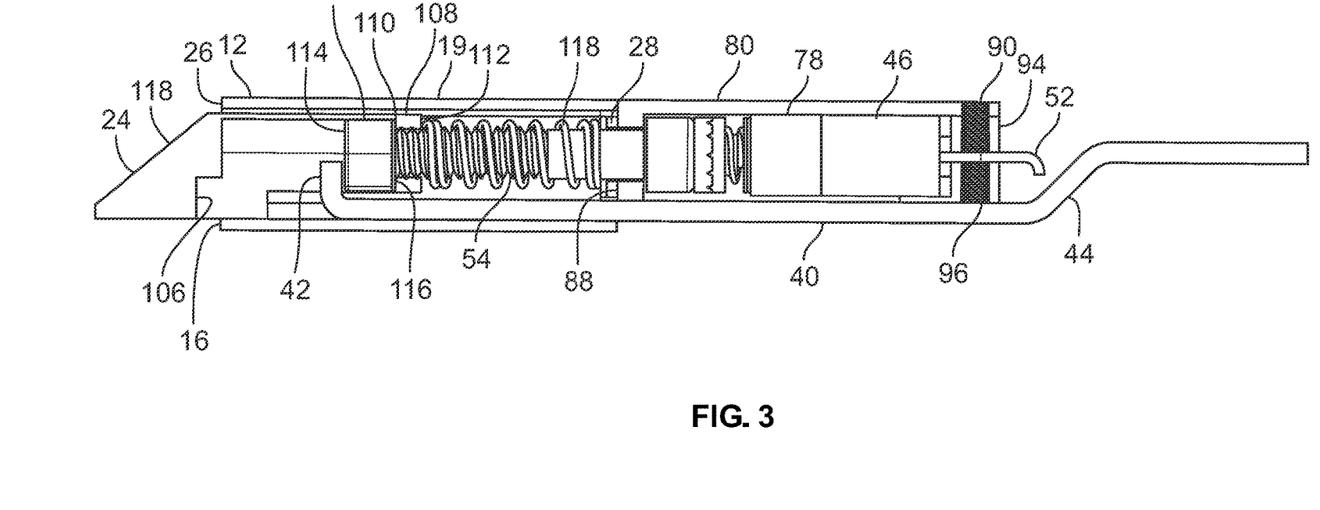
FIG. 3 is a stylized cut-away view of the inventive latch in the closed condition.

The threaded member 54 extends into the primary housing 12 and, when activated by the motor, rotates about the rotational axis 48, which is parallel to axes 38 and 50. A nut 102 is threadedly engaged with the threaded member near its distal end. The nut is confined to not rotate by being positioned in an open cavity 104 in the bolt 24, which is also confined to not rotate by being positioned in the primary housing 12 for only sliding motion along axis 38. Accordingly, when the threaded member 54 is rotated, the nut 102 moves translationally along axis 38. The nut has a front face 114 and a rear face 116. A biasing means such a spring 118 surrounds the threaded member 54 between the rear face 112 of the rear wall 108 of the bolt 24 and the back wall 28 of the primary housing 12, urging the bolt 24 away from the back wall 28 of the primary housing 12 and out of the open front end 26 of the primary housing 12. In the closed condition as shown in FIG. 3 and the first (FIG. 4) and second (FIG. 5) open conditions, the front face 114 of the nut 102 is adjacent the sled lip 42. Absent a force, such as force F3, the biasing force or spring 118 also urges the motor housing 80 against the primary housing 12.

When the motor 46 is activated by an electrical signal and rotates the threaded member 54 in a first direction, the threads of the threaded member 54 cooperate with the threads of the nut to move the nut 102 in a first direction away from the open end 26 of the primary housing 12. The rear face 116 of the nut 102 contacts the front face 110 of the rear wall 108 of the bolt 24 to retract the bolt from extending out from the open end 26 of the primary housing to cause a third open condition as shown on FIG. 6. The motor 46 can then be rotated in a second direction causing the threaded member 54 to also rotate in a second opposite direction, which will move the nut 102 in a second opposite direction back to a position proximate the open end 26 of the primary housing 12. This will allow the bolt 24 to extend from the open end 26 to create a closed condition as shown in FIG. 3 provided there are no external forces on the bolt 24 or sled 40. Although the threaded member in the figures is shown with a relatively fine thread, other thread shapes and pitches are contemplated by the invention.

Figure 4:
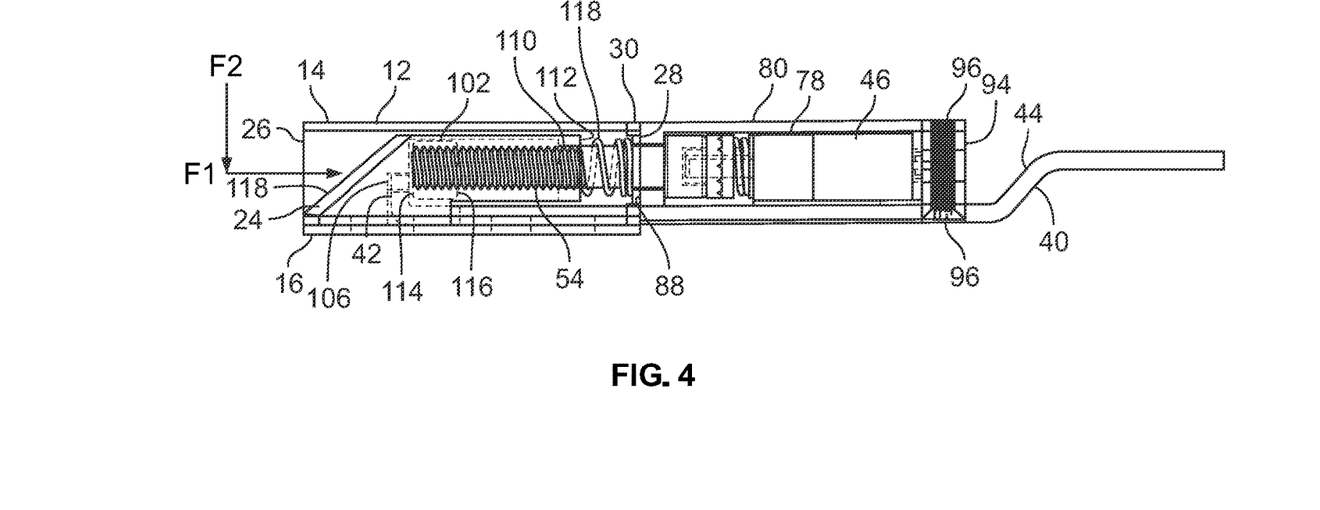
FIG. 4 is a stylized cut-away view of the inventive latch in a first open condition.

As noted above, in addition to the bolt 24 being retracted from extending past the open end of the primary housing by an electrical signal driving the motor 46 (as shown in FIG. 6), the bolt can be retracted mechanically in two additional ways. As can be appreciated in comparing FIGS. 1, 3 and 4, the bolt 24 can be retracted by a force F1 acting on the angled front face 118 of the front wall 106 of the bolt 24 along the longitudinal axis 38 of the primary housing 12. Force F1 overcomes the bias of spring 118 between the rear face 112 of the rear wall 108 of the bolt 24 and the back wall 28 of the primary housing 12, collapsing the spring 118 and allowing the bolt to slide into the primary housing 12. In use, the force F1 is usually a resultant force caused by the force F2 of a striker 20 moving in a plane normal to the longitudinal axis of the primary housing 12 and striking the angled face 118 of the bolt, causing force F1. Further retraction of the bolt 24 into the primary housing 12 in the first open condition is halted by the backside of the front wall 106 of the bolt 24 contacting the front face 114 of the nut 102, or the lip 42 as shown in FIG. 4. It can be appreciated that once force F1 is removed from the front face 118 of the bolt 24, the biasing member, or spring 118, will urge the bolt 24 to slide out of the open end 26 of the primary housing 12 to a closed condition as shown in FIGS. 1 and 3.

Figure 5:
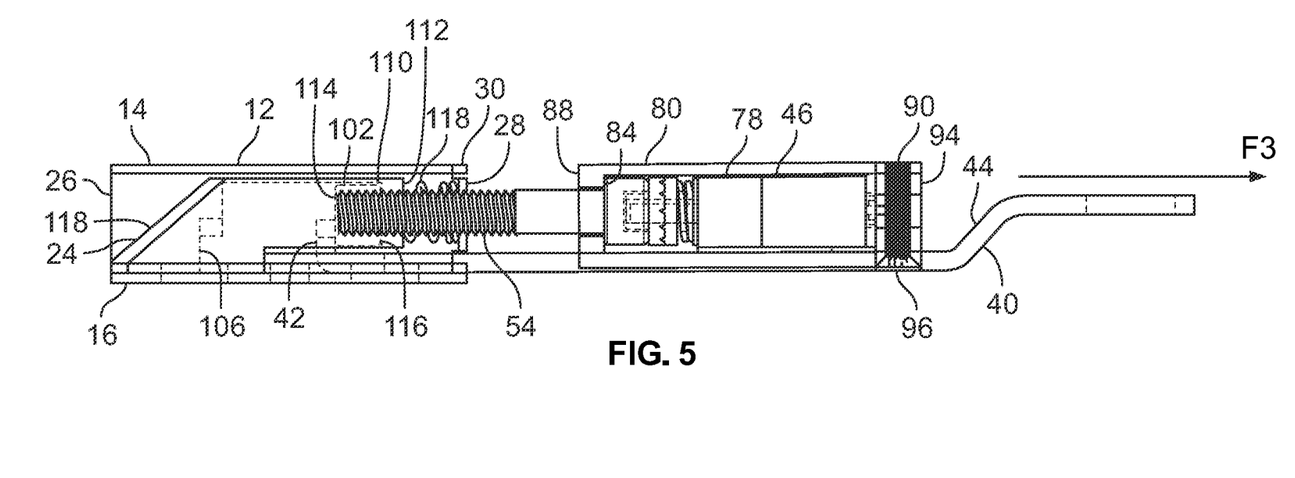
FIG. 5 is a stylized cut-away view of the inventive latch is a second open condition.

Sliding the sled 40 out of the housing 12 can also retract the bolt 24 from extending out of the primary housing 12, as shown in FIG. 5. A force F3 exerted on the extension 44 of the sled pulls the sled 40, motor 46, motor housing 80 and threaded member 54 away from the back wall of 28 of the primary housing 12. The back face 116 of the nut contacts the front face 110 of the rear wall 108 of the bolt 24. Force F3 overcomes the bias of spring 118 between the rear face 112 of the rear wall 108 of the bolt 24 and the back wall 28 of the primary housing 12, collapsing the spring 118 and allowing the bolt to slide into the primary housing 12. In one embodiment, a cable or other means can be attached to the sled extension 44 through the aperture 126 in the extension to provide force F3. It can be appreciated that if force F3 is removed from the extension 44, the biasing member or spring 118 will urge the bolt 24 to slide out of the open end 26 of the primary housing 12 to a closed condition as shown in FIGS. 1 and 3.

Figure 8:
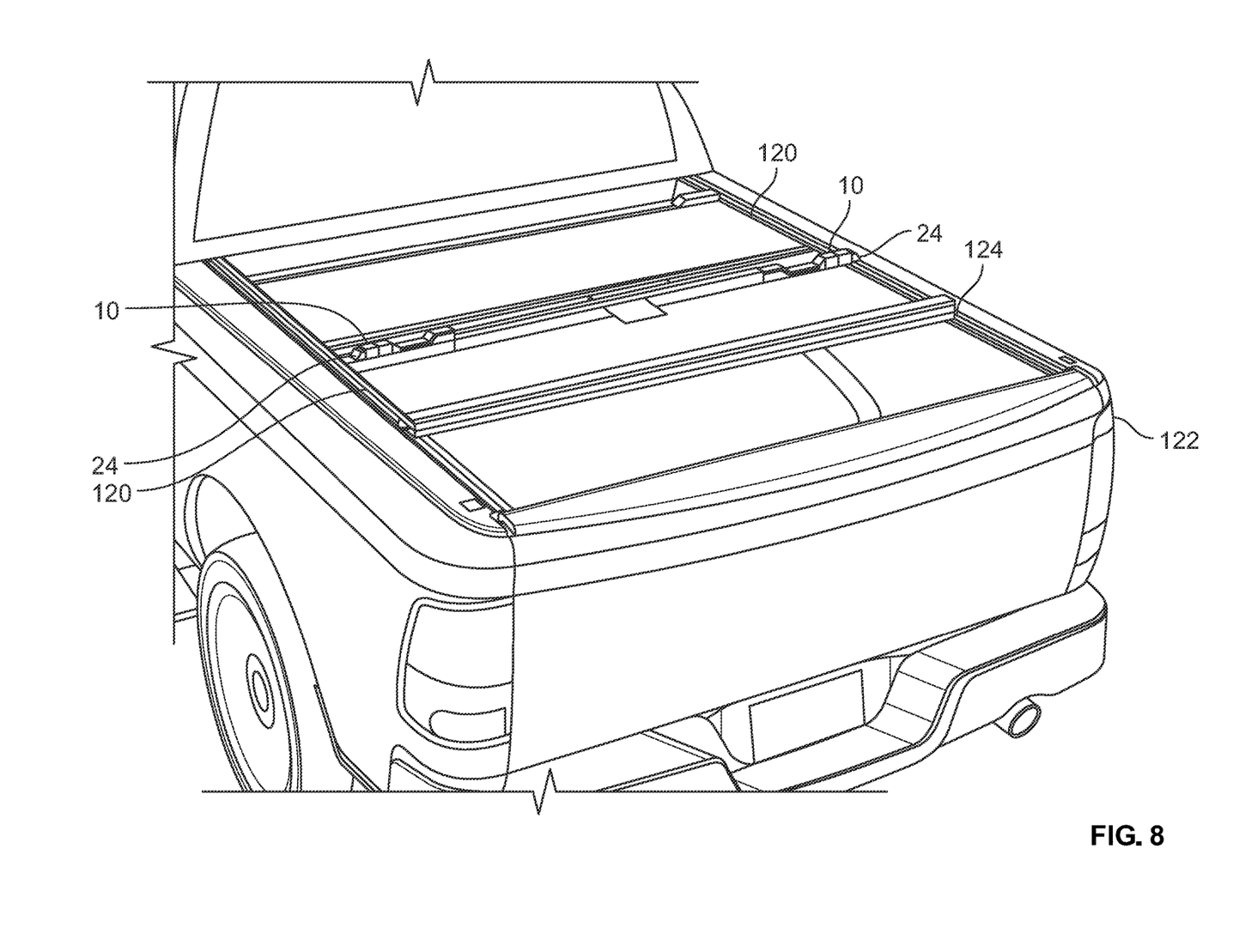
FIG. 8 is a perspective view of the inventive latch incorporated into a tonneau cover of a pickup truck.

The inventive latch 10 may be incorporated into automobile or truck accessories. For example, the latch can be used with an access door to a pickup truck cap or with a tonneau cover. FIG. 8 shows a pair of latches 10 on either side of the inside of a tonneau cover 120 mounted on a pickup truck 122. The tonneau cover 120 is folded over at a first hinge 124 to expose the latches 10 and the extended bolts 24. A lockable rotating mechanical handle (not shown) is located on the opposite side of the rear of the cover in the center between the two latches and connected to the latches 10 by cables (not shown) to open the tonneau cover 120 by rotating the handle to pull on the cables to retract the bolts 24 by a force on the sleds 44 as shown in FIG. 5 and described above. Alternatively, the tonneau cover can be opened by pressing a fob or keypad or smart phone to activate the motors to retract the bolts 24 as shown in FIG. 6. With the tonneau cover in the open positon, as shown in FIG. 8, the cover can be easily closed by rotating the back portion of the cover about the hinge 124 and allowing the cover to slam shut with the sides of the truck bed acting as strikers passing by the bolts 24 as shown in FIG. 4. After being shut, the latches revert to the closed condition, as shown if FIGS. 1 and 4, and the ledge on the side of the truck is captured by the backside of the bolt and the cover is secured.

In similar manner, the access door to a truck cap can be opened mechanically, for example, by a cable attached to the extension of the sled and opened as shown in FIG. 5 and described above. The cable can be pulled by various means, including turning a remote handle that has the cable attached to a lever on the backside of the handle. Alternatively, the door can be opened by an electrical signal to the motor 46, which retracts the bolt as shown in FIG. 6 and described above. Power to the motor can come from wiring form the vehicle's main 12-volt battery, or a smaller rechargeable or replaceable battery associated with the latch, thus not requiring additional wires in the vehicle. If a smaller battery is incorporated, it may be rechargeable by, for example, by a photovoltaic cell. The electrical signal can originate from a fob or a keypad or smart phone to unlock the access door. One example of the use of the inventive latch in conjunction with vehicle accessories can be found in co-pending U.S. patent application Ser. No. 16/708,880 entitled Systems and Methods for Remotely Locking and Unlocking Vehicle Accessory Locks, the disclosure of which is incorporated herein.

Although the provision of the slip clutch 56 provides some assurance that excess torque from the motor drive shaft 60 will not damage other portions of the latch, it is desirable in some instances that the motor have other electronic controls. For example, the amount of time that the motor 46 operates or the number of rotations of the motor or drive shaft may be counted electronically in order to control the rotation of the threaded member 54 and the distance of travel of the nut 102. Other electrical control circuitry is contemplated and may be located in the motor housing 80 or remotely. Other controls and sensors, such as a proximity sensor to sense the position of the bolt 24 directly are also contemplated. A timer may also be employed to monitor the time that the motor rotates and 46 retracts the bolt into the third open condition as shown in FIG. 6 before it automatically reverses the rotation of the motor 46 to return the latch to the closed condition.

Although the above described latch has been described, modifications to the structure and associated uses are contemplated by this disclosure. In some embodiments, other means for moving the bolt 24 or sled 40 are contemplated and should be included.

Various embodiments disclosed herein are to be taken in the illustrative and explanatory sense, and should in no way be construed as limiting of the present disclosure. While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

I claim:

1. A sliding latch having a closed condition and an open condition comprising,
    a primary housing having a longitudinal axis and a substantially open front end and a back end with a wall having an inner side facing the front end and an opening,
    an elongated sled having a longitudinal axis parallel to the housing longitudinal axis and a lip at a first end proximate the housing front end and a rear extension extending through the housing back end wall opening, the sled adapted to slide in the housing along the housing longitudinal axis,
    an electric motor having a rotational axis parallel to the sled longitudinal axis and mounted on the sled and adapted to rotate a threaded member having an axis parallel with the motor rotational axis and extending through the opening in the back wall of the housing, a retractable bolt adapted to slide along the primary housing longitudinal axis and extending outwardly from the housing front end in the closed condition, the bolt having a front wall and a back wall and an internal cavity, with the back wall having an inner side facing the cavity and an outer side opposite the cavity and an opening therein with the threaded member extending through the opening into the cavity, an internally threaded nut non-rotatingly captured in the bolt cavity having a first side and a second side, with the nut threadedly engaging the threaded member, a biasing member biasing the bolt to a closed condition having a first end contacting the outer side of the back wall of the bolt and a second end contacting the inner side of the back wall of the primary housing, wherein in the closed condition, the bolt extends outwardly from the housing front end and the nut first side is adjacent the lip and the nut second side is adjacent the bolt back wall, and wherein in a first open condition the bolt is retracted into the housing by an external force on the bolt along the housing longitudinal axis against the biasing member while the nut first side remains adjacent the lip, and wherein in a second open condition, the bolt is retracted into the housing by an external force pulling the sled along the housing longitudinal axis against the biasing member and the sled lip moving the nut and causing the nut second side to contact the inner side of the back wall of the bolt, and wherein in a third open condition, the bolt is retracted into the housing against the biasing member by the motor rotating the threaded member in a first direction thus moving the nut and the nut second side contacting the bolt cavity back wall.

2. The latch of claim 1 wherein the sled also comprises a stop to refrain the sled lip from extending from out of the housing front end.

3. The latch of claim 2 also comprising a housing around the motor with a front wall having an opening through which the threaded member extends.

4. The latch of claim 3 wherein the motor is mounted on the sled by being captured between the motor housing and the sled.

5. The latch of claim 4 wherein the stop for the sled comprises the contact of the front wall of the motor housing with the rear wall of the primary housing.

6. The latch of claim 1 wherein the threaded member is a screw with a threaded shaft and a drive head and the biasing member is a spring surrounding the shaft of the threaded member.

7. The latch of claim 1 wherein the motor has a motor drive shaft, the threaded member has a drive head, and the latch includes a clutch between the motor drive shaft and the threaded member drive head.

8. The latch of claim 7 wherein the clutch comprises a pair of discs with one disc drivingly mounted on the motor drive shaft and the other disc drivingly mounted on the threaded member and a clutch biasing means for biasing the discs against each other.

9. The latch of claim 1 wherein the primary housing also comprises a base plate adapted to be mounted on a substrate and the bolt has an inclined front face with the incline coming to a point adjacent the substrate.

10. The latch of claim 9 wherein the latch is changed from the closed condition to the first open condition by a striker moving normal to the longitudinal axis and the inclined front face forcing bolt into the housing and the latch into the first open condition.

11. The latch of claim 10 wherein after the striker passes by the bolt, the biasing member forces the bolt into the closed condition capturing the striker on the backside of the bolt.

* * * * *